May 9, 1933.                A. G. LUNDIN                1,907,553
                           AUTOMATIC CHUCK
                         Filed Sept. 13, 1932

INVENTOR
Axel G. Lundin
BY
Sydney P. Prescott
ATTORNEY

Patented May 9, 1933

1,907,553

UNITED STATES PATENT OFFICE

AXEL G. LUNDIN, OF BLAIRSTOWN, NEW JERSEY, ASSIGNOR TO AMERICAN MACHINE & FOUNDRY COMPANY, A CORPORATION OF NEW JERSEY

AUTOMATIC CHUCK

Application filed September 13, 1932. Serial No. 632,985.

This invention relates to chucks, particularly to that type in which the gripping and releasing of a tool may be effected while the chuck is rotating. The main object of the invention, therefore, is the production of an improved chuck of this type. With this and other objects not specifically mentioned in view, the invention consists in certain constructions and combinations hereinafter fully described and then specifically set forth in the claims hereunto appended.

Figure 1:
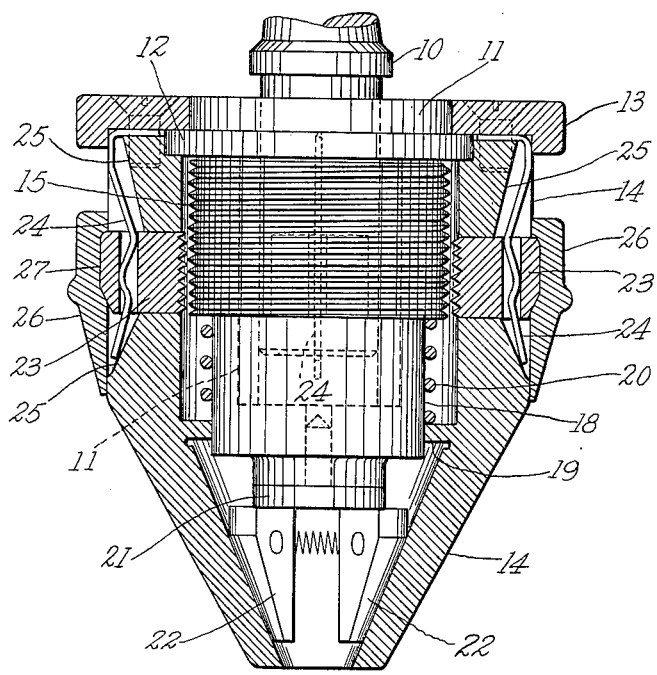
Figure 2:
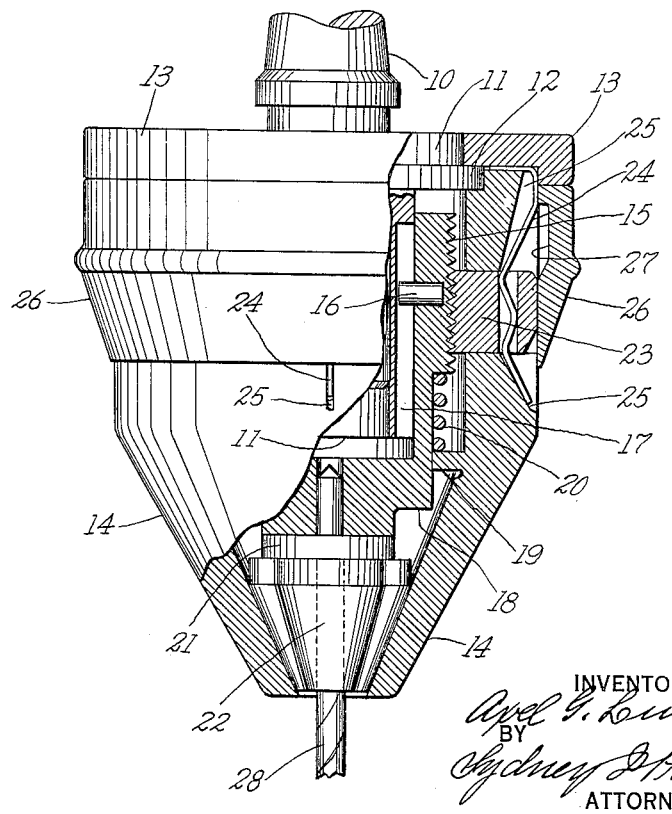

In the accompanying drawing which forms a part of this specification and in which like characters of reference indicate the same or like parts:

Fig. 1 is a sectional side elevation of the automatic chuck showing the jaw members in their open or idle position; and Fig. 2 is a sectional side elevation of the same, showing the jaw members in their closed or working position.

In carrying the invention into effect there is provided a hollow shell having a tapered bore, a driving shank having a body rotatably supported in said shell, a threaded annular spindle disposed within the shell and splined to the body, means yieldingly supporting the spindle in the shell, chasers slidably mounted in the shell and having threads on their inner ends fitting the threads on the spindle, springs urging the chasers away from said spindle, tool gripping jaws disposed within said bore and adapted to be closed on the tool by downward movement of the spindle, and a lock ring surrounding the chasers and adapted to force the latter inwardly to bring their threaded ends into engagement with the threaded portion of the spindle. In the best constructions contemplated the lock ring has an annular groove permitting the chasers to spring away from the spindle when the groove is moved into alignment therewith. These various means and parts may be widely varied in construction within the scope of the claims for the particular device selected to illustrate the invention is but one of many possible concrete embodiments of the same. The invention, therefore, is not to be restricted to the specific construction shown and described.

Referring to the drawing, the shank 10 which is integral with the chuck body 11, rotates freely in the shell 14 in which it is supported by the shoulder 12 bearing against the cover 13 and the annular groove in the top part of shell 14. The cover is attached to the shell by screws as shown in Fig. 1. The body 11 has an annular spindle 15 splined thereto by a key 16 which is slidably mounted in a keyway 17 of body 11. The upper part of the spindle 15 is threaded and its lower part 18 is guided in an annular opening provided by the partition 19 of shell 14 and a shoulder on the lower end of the chuck body. A compression spring 20 which is seated between the partition 19 and a shoulder of spindle 15 below its threaded portion holds the spindle in its up-position (see Fig. 1). The plug 21 which has a stem fitted into the lower part of the spindle rests against the tool gripping jaws 22 floating within a tapered bore provided in the lower end of the shell and normally held in expanded position by springs interposed between the gripping jaws. The shell 14 has a plurality of slots into which are fitted chaser members 23, having threaded portions on their inner sides adapted to fit the threaded portions of the spindle, and normally are urged outwardly by leaf springs 24 located in slots 25 of shell 14. A lock ring 26 surrounds the shell 14 and engages the chaser members 23.

The operation of the automatic chuck is as follows:

Referring to Fig. 1, the lock ring 26 has an annular groove 27 corresponding to the shape of the chaser members 23, thus when the ring 27 is in its down-position the chasers are pressed outwardly into the groove by the springs 24, and thereby remain out of engagement with the spindle 15. In this position, the compression spring 20 holds the spindle up against the shoulder 12, thereby allowing the tool gripping jaws 22 to remain in their open position. The shank 10 together with the body 11 and the spindle 15 are thus free to rotate while the rest of the unit remains idle. When the ring 26 (Fig. 2) is pushed axially upwards, the chaser members 23 are expelled from the groove 27 and the vertical part of the ring 26 forces their threaded inner ends into the threaded portion of the spindle 15. The rotation of the spindle while engaged by the relatively stationary chaser members 23 forces the spindle downward, the key 16 sliding in the keyway 17 of body 11. Thus the spring 20 is compressed and the pressure applied to the plug 21 closes the tool gripping jaws 22, thereby permitting them to grip the tool 28 and rotate the same, and pressing them against the shell to frictionally grip the latter and rotate it with the spindle. When the tool is to be released from the jaw 22, the ring 26 is forced downward and the chaser members 23 spring back into the annular groove 27. The disengaging of the chaser members 23 from the spindle 15 allows the spring 20 to return the spindle to its former position, thus opening the tool gripping jaws 22 to release the tool 28 and stopping the rotation of the shell.

What is claimed is:

1. In a chuck, the combination with a hollow slotted shell having a tapered bore, of a driving shank having a body rotatably supported in said shell, a threaded annular spindle disposed within said shell and splined to said body, means yieldingly supporting said spindle in said shell, chaser members slidably mounted in said slots to move radially of the shell and having threads on their inner ends adapted to fit the threads on said spindle, springs urging said chaser members away from said spindle, tool gripping jaws disposed within said bore and adapted to be closed on a tool by downward movement of said spindle, and a lock ring surrounding the shell and chaser members and adapted to force the latter inwardly to bring their threaded ends into engagement with the threaded portion of the spindle, whereby rotation of said shank and body will force the spindle downward against the resistance of its supporting means and close the tool gripping jaws on the tool to grip and rotate the same and cause them to frictionally grip the shell to rotate it with the spindle.

2. In a chuck, the combination with a hollow slotted shell having a tapered bore, of a driving shank having a body rotatably supported in said shell, a threaded annular spindle disposed within said shell and splined to said body, means yieldingly supporting said spindle in said shell, chaser members slidably mounted in said slots to move radially of the shell and having threads on their inner ends adapted to fit the threads on said spindle, springs urging said chaser members away from said spindle, tool gripping jaws disposed within said bore and adapted to be closed on a tool by downward movement of said spindle, and a lock ring surrounding the shell and chaser members and adapted to force the latter inwardly to bring their threaded ends into engagement with the threaded portion of the spindle, whereby rotation of said shank and body will force the spindle downward against the resistance of its supporting means and close the tool gripping jaws on the tool to grip and rotate the same and cause them to frictionally grip the shell to rotate it with the spindle, said ring having an annular groove permitting the chaser members to spring away from the spindle when the ring is moved to bring the groove into alignment with the ends of the chaser members.

3. In a chuck, the combination with a hollow slotted shell having a tapered bore, of a driving shank having a body rotatably supported in said shell, a threaded annular spindle disposed within said shell and splined to said body, means yieldingly supporting said spindle in said shell, chaser members slidably mounted in said slots to move radially of the shell and having threads on their inner ends adapted to fit the threads on said spindle, springs urging said chaser members away from said spindle, tool gripping jaws disposed within said bore and adapted to be closed on a tool by downward movement of said spindle, and a lock ring surrounding the shell and chaser members and adapted to force the latter inwardly to bring their threaded ends into engagement with the threaded portion of the spindle, whereby rotation of said shank and body will force the spindle downward against the resistance of its supporting means and close the tool gripping jaws on the tool to grip and rotate the same and cause them to frictionally grip the shell to rotate it with the spindle, said spindle having a shoulder below its threaded portion and a plug on its lower end adapted to engage the upper ends of said jaws, and said spindle supporting means including a partition on the interior of said shell having a bore through which the spindle passes, and a spring seated between partition and shoulder to yieldingly support the spindle.

4. In a chuck, the combination with a hollow slotted shell having a tapered bore, of a driving shank having a body rotatably supported in said shell, a threaded annular spindle disposed within said shell and splined to said body, means yieldingly supporting said spindle in said shell, chaser members slidably mounted in said slots to move radially of the shell and having threads on their inner ends adapted to fit the threads on said spindle, springs urging said chaser members away from said spindle, tool gripping jaws disposed within said bore and adapted to be closed on a tool by downward movement of said spindle, and a lock ring surrounding the shell and chaser members and adapted to force the latter inwardly to bring their threaded ends into engagement with the threaded portion of the spindle, whereby rotation of said shank and body will force the spindle downward against the resistance of its supporting means and close the tool gripping jaws on the tool to grip and rotate the same and cause them to frictionally grip the shell to rotate it with the spindle, said body having an annular shoulder, and said shell having an annular groove in its upper end in which said shoulder is freely rotatable, and a cover secured to said upper end and engaging the shoulder to hold said body against axial movement.

In testimony whereof, I have signed my name to this specification.

AXEL G. LUNDIN.